(12) United States Patent
Minato

(10) Patent No.: US 9,752,934 B2
(45) Date of Patent: Sep. 5, 2017

(54) WAVELENGTH CALIBRATION METHOD FOR MONOCHROMATOR

(71) Applicant: SHIMADZU CORPORATION, Kyoto-shi, Kyoto (JP)

(72) Inventor: Hiroyuki Minato, Kyoto (JP)

(73) Assignee: SHIMADZU CORPORATION, Kyoto-shi (JP)

( * ) Notice: Subject to any disclaimer, the term of this patent is extended or adjusted under 35 U.S.C. 154(b) by 90 days.

(21) Appl. No.: 14/478,903

(22) Filed: Sep. 5, 2014

(65) Prior Publication Data

US 2015/0070695 A1   Mar. 12, 2015

(30) Foreign Application Priority Data

Sep. 6, 2013   (JP) ................................ 2013-185593

(51) Int. Cl.
 *G01J 3/42*   (2006.01)
 *G01J 3/18*   (2006.01)
 *G01J 3/28*   (2006.01)

(52) U.S. Cl.
 CPC . *G01J 3/18* (2013.01); *G01J 3/28* (2013.01); *G01J 2003/2866* (2013.01)

(58) Field of Classification Search
 CPC ...... G01J 3/18; G01J 3/28; G01J 3/027; G01J 2003/2866; G01J 3/0286; G01J 2003/062
 See application file for complete search history.

(56) References Cited

U.S. PATENT DOCUMENTS

| 4,441,815 A | * | 4/1984 | Izumi | ...................... | G01J 3/433 250/373 |
| 7,072,037 B2 | * | 7/2006 | Harada | ...................... | G01J 3/18 356/333 |

(Continued)

FOREIGN PATENT DOCUMENTS

| CN | 101393117 A | 3/2009 |
| JP | 2000-74820 A | 3/2000 |

(Continued)

OTHER PUBLICATIONS

Communication dated Feb. 22, 2016 from the State Intellectual Property Office in counterpart application No. 201410454212.7.

(Continued)

*Primary Examiner* — Kara E Geisel
*Assistant Examiner* — Maurice Smith
(74) *Attorney, Agent, or Firm* — Sughrue Mion, PLLC

(57) ABSTRACT

Provided is a method for performing a wavelength calibration of a monochromator with a diffraction grating by casting light from a standard light source whose emission intensity contains a change with a predetermined cycle onto the diffraction grating and measuring an intensity of light reflected by the grating. The method includes the steps of: measuring at least two times the intensity of the reflected light from the grating within the aforementioned cycle at each of the rotational positions of the grating corresponding to a range of wavelengths including a peak wavelength of a bright line spectral light generated by the standard light source; determining an intensity value 201 at each rotational position based on all the measured values obtained at the rotational position; and locating, as the peak wavelength of the bright line spectral light, a wavelength at which the intensity value 201 is maximized.

4 Claims, 2 Drawing Sheets

(56) References Cited

U.S. PATENT DOCUMENTS

| | | | | |
|---|---|---|---|---|
| 8,810,790 B2* | 8/2014 | Yokota | ............... | G01J 3/0202 |
| | | | | 356/326 |
| 2005/0162650 A1* | 7/2005 | Yamamoto | ............... | G01J 3/28 |
| | | | | 356/328 |
| 2009/0079979 A1* | 3/2009 | Minato | ............... | G01J 3/02 |
| | | | | 356/317 |
| 2011/0019192 A1* | 1/2011 | Imura | ............... | G01J 3/10 |
| | | | | 356/421 |

FOREIGN PATENT DOCUMENTS

| | | | |
|---|---|---|---|
| JP | 2002-202189 A | 7/2002 | |
| JP | 2006-194812 A | 7/2006 | |
| JP | 2009-74877 A | 4/2009 | |

OTHER PUBLICATIONS

Communication dated Jun. 21, 2016, from the State Intellectual Property Office of People's Republic of China in counterpart application No. 201410454212.7.

Chandrasekhar, T. et al., "A Simple Internal Modulation Technique for the Spectral Calibration of Circular Variable Filter Spectrometers in the Near-Infrared", Infrared Physics, vol. 24, Issue 6, Nov. 1984, pp. 571-572.

Communication dated Dec. 6, 2016 from the Japanese Patent Office in corresponding Application No. 2013-185593.

* cited by examiner

WAVELENGTH CALIBRATION METHOD FOR MONOCHROMATOR

TECHNICAL FIELD

The present invention relates to a wavelength calibration method for a monochromator having a diffraction grating, and a spectrophotometer having such a wavelength calibration function.

BACKGROUND ART

A monochromator having a diffraction grating is used in various devices, such as a spectrophotometer or a detector for a chromatograph (see Patent Literature 1). As one example of the commonly used spectrophotometers, a schematic configuration of a spectrofluorophotometer is shown in FIG. 1 (see Patent Literature 2). The spectrofluorophotometer 100 includes a light source unit 10, an excitation monochromator unit 20, a monitor unit 30, a sample chamber 40 and a fluorescence monochromator unit 50.

The light source unit 10 includes a light-condensing mirror 12 for condensing light emitted from a light source 11 (e.g. xenon lamp). The light condensed by the light-condensing mirror 12 travels through a first slit 13 into the excitation monochromator unit 20.

The light which has entered the excitation monochromator unit 20 is reflected by a reflection mirror 21 to a first diffraction grating 22 and dispersed in the wavelength direction by the grating 22. A portion of the light dispersed by the diffraction grating 22 passes through a second slit 23 and enters the monitor unit 30 as excitation light. The excitation monochromator unit 20 further includes a grating drive mechanism 24 for rotating the diffraction grating 22 about a rotation axis 22a. The wavelength of the excitation light can be arbitrarily set within a predetermined range of wavelengths by rotating the diffraction grating 22 through the grating drive mechanism 24.

In the monitor unit 30, a beam splitter 31 is placed on the path of the excitation light, whereby the excitation light is split into two directions. That is to say, a portion of the excitation light passes through the beam splitter 31 and reaches a sample cell 41 inside the sample chamber 40 after being condensed by a first lens 32. The other portion of the excitation light is reflected by the beam splitter 31 and condensed by a second lens 33, to be eventually detected by a control light detector 34 (e.g. a photodiode).

The excitation light which has reached the sample cell 41 causes the sample in the cell 41 to emit fluorescence. A portion of the fluorescence is condensed by a third lens 42 and enters the fluorescence monochromator unit 50.

A portion of the fluorescence which has entered the fluorescence monochromator unit 50 passes through the third slit 51 and falls onto a second diffraction grating 52, to be dispersed in the wavelength direction by the grating 52. A component of the dispersed light having a specific wavelength passes through a fourth slit 53, to be eventually detected by a fluorescence detector 54 (e.g. a photomultiplier). The fluorescence monochromator unit 50 further includes a grating drive mechanism 55 for rotating the diffraction grating 52 about a rotation axis 52a. The wavelength of the light to be detected by the fluorescence detector 54 can be arbitrarily set within a predetermined range of wavelengths by rotating the diffraction grating 52 through the grating drive mechanism 55.

To correctly perform an analysis of a sample using such a spectrofluorophotometer, both the wavelength of the excitation light passing through the second slit 23 and that of the detection light passing through the fourth slit 53 need to be set at the respective correct values. To this end, it is necessary to perform "calibration", i.e. the task of correcting those wavelength values.

The wavelength calibration of a monochromator is performed using a standard light source, such as a sodium lamp or a mercury lamp, which generates a bright line spectral light to be used as the reference (see Patent Literatures 3 and 4). In the case of the previously described spectrofluorophotometer, the wavelength calibration is performed as follows: Initially, the light source unit 10 is configured so that a bright line spectral light to be used as the reference can be supplied to the monochromator. For example, this is achieved by replacing the light source 11 with a standard light source, or by switching the optical path to a built-in standard light source for wavelength calibration using a mirror or similar element (if the spectrofluorophotometer has such a light source). Subsequently, while the diffraction grating in the monochromator (the first or second diffraction grating 22 or 52) is being rotated, the output from the control light detector 34 or the fluorescence detector 54 is monitored so as to locate a rotational position of the diffraction grating (the first or second diffraction grating 22 or 52) at which the intensity of the diffracted light is maximized. Then, the rotational position giving the maximum intensity is related to the wavelength of the standard light source. Thus, the wavelength calibration is achieved.

In the previously described wavelength calibration method, while the diffraction grating is gradually rotated in steps of a preset wavelength resolution, the intensity of light received at a diffracted-light receiver (e.g. photodiode or photomultiplier) in the monochromator is detected at each rotational position, and the rotational position of the diffraction grating at which the intensity of the received light is maximized is located within a predetermined range of rotational positions. This approach has a problem in that, if the emission intensity of the standard light source for wavelength calibration changes, the intensity of the received light detected at each rotational position varies, which makes it impossible to correctly locate the rotational position at which the intensity of the received light is maximized, so that the wavelength calibration cannot be correctly performed.

CITATION LIST

Patent Literature

Patent Literature 1: JP 2006-194812 A
Patent Literature 2: JP 2009-074877 A
Patent Literature 3: JP 2000-074820 A
Patent Literature 4: JP 2002-202189 A

SUMMARY OF INVENTION

Technical Problem

The problem to be solved by the present invention is to provide a wavelength calibration method by which wavelength calibration can be correctly performed even if the emission intensity of the standard light source for wavelength calibration changes.

Solution to Problem

The present inventor has found that, when a commercial power source is used as the power supply for the standard light source for wavelength calibration, the emission intensity of the standard light source may change, which prevents a correct wavelength calibration. That is to say, given that $T_s$ denotes the cycle with which the commercial AC power alternately changes ($T_s$ is 1/50 seconds in eastern Japan and 1/60 seconds in western Japan), the instantaneous power level of the commercial power source changes with cycle T equal to one half of $T_s$ (T is 10 ms in eastern Japan and 8.3 ms in western Japan). This change appears as a component with cycle T in the emission intensity of the standard light source energized by a commercial power source. This finding has led to the present invention.

The wavelength calibration method for a monochromator according to the present invention aimed at solving the aforementioned problem is a method for performing a wavelength calibration by casting light from a standard light source whose emission intensity contains a change with a predetermined cycle onto a diffraction grating in the monochromator and measuring an intensity of light reflected by the diffraction grating, the method including the steps of:

a) measuring at least two times the intensity of the reflected light from the diffraction grating within the aforementioned cycle at each of the rotational positions of the diffraction grating corresponding to a range of wavelengths including a peak wavelength of a bright line spectral light generated by the standard light source;

b) determining an intensity value at the rotational position based on all the measured values obtained at the rotational position; and c) locating, as the peak wavelength of the bright line spectral light, a wavelength at which the intensity value is maximized.

The spectrophotometer according to the present invention aimed at solving the aforementioned problem includes:

a) a monochromator having a diffraction grating for receiving and diffracting light from a standard light source for generating a known bright line spectral light whose emission intensity contains a change with a predetermined cycle, and a grating drive mechanism for rotating the diffraction grating;

b) a light measurer for measuring an intensity of light from the monochromator;

c) a monochromator controller for controlling the grating drive mechanism so as to rotate the diffraction grating in steps of a predetermined wavelength within a range including a peak wavelength of the bright line spectral light;

d) an emission intensity determiner for measuring at least two times the intensity of light from the monochromator by means of the light measurer within the aforementioned cycle at each rotational position of the diffraction grating, and for determining an intensity value at the rotational position based on all the measured values obtained at the rotational position; and e) a peak locator for locating, as the peak wavelength of the bright line spectral light, a wavelength at which the intensity value is maximized within the aforementioned range.

The emission intensity determiner may determine the intensity value at each rotational position by finding the highest or lowest of all the measured values or by calculating a statistic, such as a mean value or median of all the measured values. In any cases, what is necessary is to determine the intensity value based on a uniform criterion at all the rotational positions (wavelengths) within the specified range.

Although the measurement of the intensity of light from the monochromator merely needs to be performed at least two times within each of the predetermined cycles, it is preferable to perform the measurement five or more times within each cycle so as to grasp a detailed change in the emission intensity of the standard light source.

Advantageous Effects of the Invention

In a wavelength calibration method including the steps of rotating a diffraction grating of a monochromator in steps of a wavelength resolution and finding the rotational position of the grating at which the emission intensity of light generated from a standard light source and reflected by the diffraction grating is maximized, an influence of a cyclic change in the emission intensity of the standard light source can be removed by measuring at least two times, at each rotational position, the intensity of the reflected light from the grating within each changing cycle of the emission intensity of the standard light source and determining the intensity value at the rotational position based on all the measured values obtained at that rotational position.

DESCRIPTION OF EMBODIMENTS

One mode for carrying out the present invention is hereinafter described by means of an embodiment.

Figure 1:
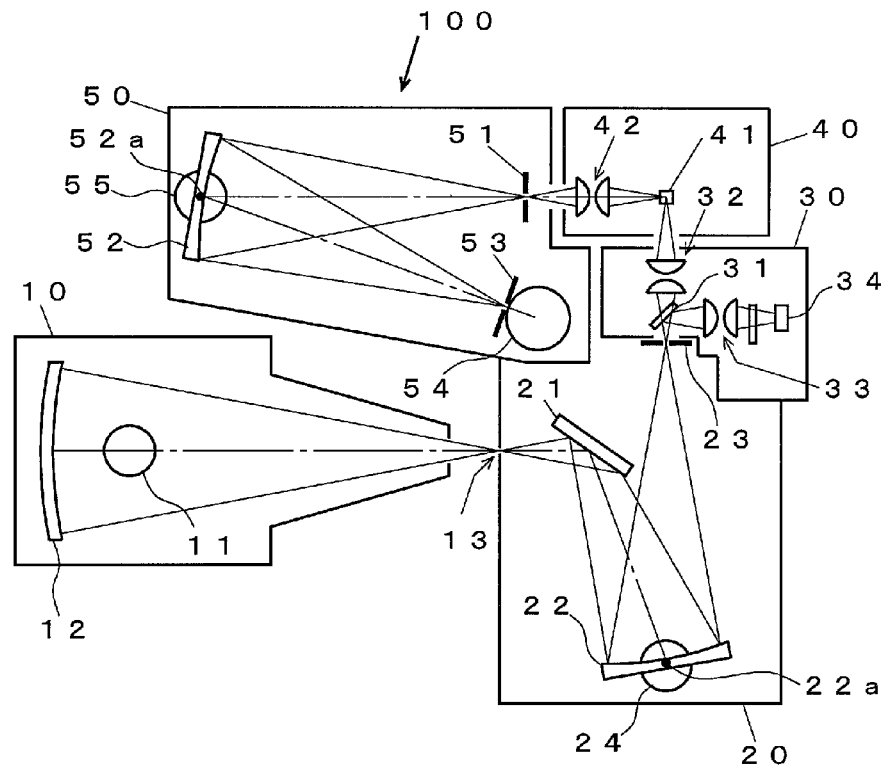
FIG. 1 is a schematic diagram showing the configuration of a conventional spectrofluorophotometer.
Figure 2:
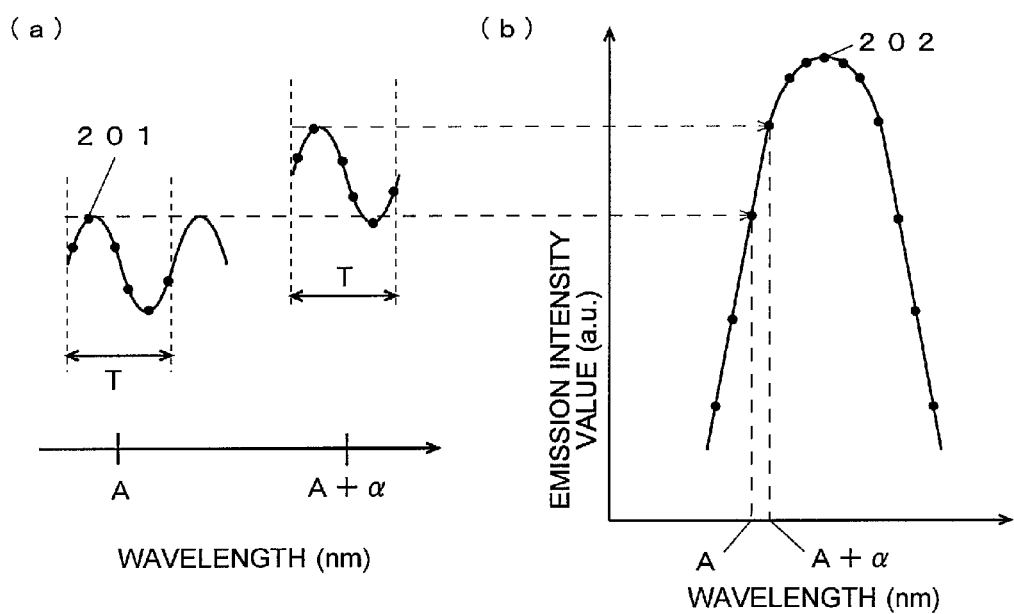
FIG. 2 shows (a) a graph illustrating a relationship between the wavelength position corresponding to the rotational position of a diffraction grating and a cyclically changing intensity of light emitted from a standard light source and reflected by the diffraction grating, and (b) a graph in which the intensity value determined for each of the wavelength positions corresponding to the rotational positions of the diffraction grating is plotted.
Figure 3:
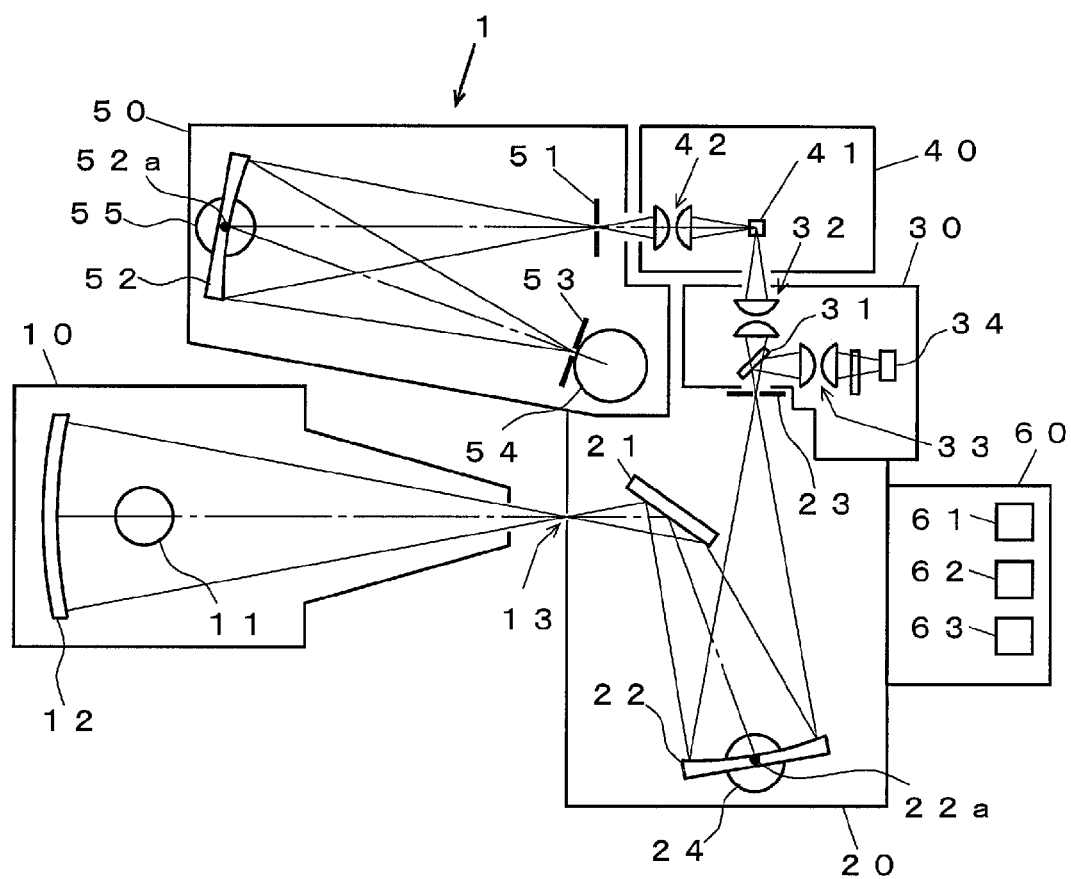
FIG. 3 is a schematic diagram showing the configuration of a spectrofluorophotometer of the present embodiment.

The embodiment of the present invention is described with reference to FIGS. 2 and 3. In FIG. 2, (a) is a graph illustrating a relationship between the wavelength position corresponding to the rotational position of a diffraction grating and a cyclically changing intensity of light emitted from a standard light source and reflected by the diffraction grating, and (b) is a graph in which the intensity value determined for each of the wavelength positions corresponding to the rotational positions of the diffraction grating is plotted. FIG. 3 is a schematic diagram showing the configuration of a spectrofluorophotometer of the present embodiment. It should be noted that the configuration of the spectrofluorophotometer of the present embodiment shown in FIG. 3 is identical to the conventional spectrofluorophotometer shown in FIG. 1 except that a control chamber 60 including a monochromator controller 61, an emission intensity determiner 62 and a peak locator 63 is added. The identical components will not be redundantly described.

In the spectrofluorophotometer 1 of the present embodiment shown in FIG. 3, when a wavelength calibration is performed, the normally used light source 11 is replaced with a mercury lamp as the standard light source, which generates a bright line spectral light with a peak wavelength of 253.7 nm. The standard light source is supplied with power from a commercial power source via a power circuit including a transformer. Therefore, the emission intensity of the standard light source contains a component which cyclically changes in a sinusoidal form with cycle T equal to one half of the cycle $T_s$ of the commercial AC power source.

For the purpose of calibration, only a limited wavelength range including the peak wavelength (253.7 nm) of the bright line spectral light of the standard light source needs to be scanned. In the present embodiment, the range from 204.0 nm to 303.4 nm inclusive of the peak wavelength is set as the target range of the wavelength calibration.

The monochromator controller 61 of the spectrofluorophotometer 1 controls the grating drive mechanism 24 or 55 so as to gradually rotate the diffraction grating 22 or 52 about the rotation axes 22a or 52a, respectively, in steps of a preset wavelength resolution ($\alpha$=0.7 nm) within a predetermined range of rotational positions of the diffraction grating 22 or 52 corresponding to the aforementioned target range of the wavelength calibration.

A specific case in which the diffraction grating 22 or 52 is at the rotational position corresponding to wavelength A nm is hereinafter described with reference to graph (a) in FIG. 2. While the diffraction grating 22 or 52 is held at this rotational position, the intensity of light emitted from the mercury lamp and reflected by the diffraction grating 22 or 52 is measured with a light measurer, i.e. the control light detector 34 or the fluorescence detector 54.

The measurement in the light measurer is performed at least two times within the changing cycle T (10 ms in eastern Japan and 8.3 ms in western Japan). In the present embodiment, as shown in graph (a) in FIG. 2, the measurement is performed six times within each cycle T. To perform the measurement at least two times within each cycle T, it is necessary to complete each measurement in the light measurer within 5 ms (or 4 ms) or shorter period of time. The larger the number of measurements is, the shorter the period of time for one measurement needs to be. With normal photodetectors, only a short period of time up to a few ten $\mu$s or several hundred $\mu$s is required for one measurement.

In graph (a) in FIG. 2, there are six points indicating the results obtained by six measurements of the intensity of light emitted from the mercury lamp and reflected by the diffraction grating 22 or 52 held at the rotational position corresponding to wavelength A nm. The six measurement results have different intensity values. In the example shown in graph (a) in FIG. 2, the highest of the six measured values is selected as the intensity value at the current rotational position of the diffraction grating 22 or 52. The emission intensity determiner 62 selects the result of the second measurement, which has yielded the highest intensity, as the intensity value 201 at the rotational position of the diffraction grating 22 or 52 corresponding to wavelength A nm. Alternatively, the emission intensity determiner 62 may select the lowest intensity among the measured values or calculate a statistic, e.g. a mean value or median of the measured values, instead of selecting the highest of the measured values as the intensity value 201 at the rotational position of the diffraction grating 22 or 52. In any cases, what is necessary is to determine the intensity value based on a uniform criterion.

Next, the grating drive mechanism 24 or 55 rotates the diffraction grating 22 or 52 to a rotational position corresponding to wavelength (A+$\alpha$) nm. Then, while the grating is held at that position, the intensity of light emitted from the mercury lamp and reflected by the diffraction grating 22 or 52 is once more measured using the light measurer, i.e. the control light detector 34 or the fluorescence detector 54. The results of six measurements performed at this position are also plotted in graph (a) in FIG. 2. As in the case of A nm, the emission intensity determiner 62 selects the result of the second measurement, which has yielded the highest of the six measured values, as the intensity value 201 at the rotational position of the diffraction grating 22 or 52 corresponding to wavelength A+$\alpha$ nm.

By repeatedly performing the process of measuring the intensity of light from the monochromator and determining the intensity value 201 at each rotational position of the diffraction grating 22 or 52 over the target range for the wavelength calibration, a graph is obtained in which the intensity value 201 determined for each of the wavelength positions corresponding to the rotational positions of the diffraction grating 22 or 52 is plotted, as shown in graph (b) in FIG. 2.

Among the intensity values 201 obtained at the respective rotational positions of the diffraction grating 22 or 52 plotted in graph (b) in FIG. 2, there is a point 202 at which the maximum intensity value is obtained. The peak locator 63 for locating the wavelength at which the intensity value is maximized locates the wavelength corresponding to this point 202 and determines that this wavelength corresponds to the peak wavelength 253.7 nm of the bright line spectral light generated by the mercury lamp used as the standard light source. Then, the rotational position of the diffraction grating 22 or 52 corresponding to that wavelength is related to the peak wavelength 253.7 nm of the bright line spectral light generated by the mercury lamp used as the standard light source, and based on this relationship, the calibration of the spectrofluorophotometer 1 is performed.

In the present embodiment, a mercury lamp which generates a bright line spectral light having a peak wavelength of 253.7 nm is used as the standard light source. The present invention is not limited to this example; any type of light source which can generate a bright line spectral light having a specific peak wavelength may be used, such as a sodium lamp. Furthermore, instead of temporarily putting a standard light source into the spectrofluorophotometer 1 in place of the light source 11, it is possible to provide the spectrofluorophotometer with a built-in standard light source for wavelength calibration so that the calibration can be performed by switching the optical path to the standard light source for wavelength calibration using a mirror or similar element.

The present invention cannot only be applied in the previously described case where the emission intensity of the standard light source cyclically changes in a sinusoidal form with cycle T equal to one half of the cycle $T_s$ of a commercial AC power source; it can also be applied in the case where the emission intensity cyclically changes in the form of triangular or rectangular waves, or the case where the emission intensity of the standard light source cyclically changes due to some reasons other than the use of a commercial power source. By measuring at least two times the reflected light from the diffraction grating within the changing cycle of the standard light source at each rotational position of the diffraction grating and determining the intensity value at the rotational position of the diffraction grating based on all the measured values based on a uniform criterion, the influence of the cyclic change in the emission intensity of the standard light source can be removed and the wavelength at which the emission intensity of the standard light source is maximized can be correctly determined.

REFERENCE SIGNS LIST

1, 100 . . . Spectrofluorophotometer
10 . . . Light Source Unit
11 . . . Light Source
12 . . . Light-Condensing Mirror 13, 23, 51, 53 . . . Slit
20 . . . Excitation Monochromator Unit
21 . . . Reflection Mirror
22, 52 . . . Diffraction Grating
22a, 52a . . . Rotation Axis
24, 55 . . . Grating Drive Mechanism
30 . . . Monitor Unit
31 . . . Beam Splitter
32, 33, 42 . . . Lens
34 . . . Control Light Detector
40 . . . Sample Chamber
41 . . . Sample Cell
50 . . . Fluorescence Monochromator Unit
54 . . . Fluorescence Detector
60 . . . Control Chamber
61 . . . Monochromator Controller
62 . . . Emission Intensity Determiner
63 . . . Peak Locator

The invention claimed is:

1. A method for performing a wavelength calibration comprising steps of:
   casting light from a standard light source whose emission intensity contains a change with a predetermined cycle due to a use of a power source for the standard light source onto a diffraction grating in a monochromator;
   measuring at least two times the intensity of the reflected light from the diffraction grating within the aforementioned cycle at each of rotational positions of the diffraction grating corresponding to a range of wavelengths including a peak wavelength of a bright line spectral light generated by the standard light source;
   determining an intensity value at the rotational position based on all measured values obtained at the rotational position; and
   locating, as the peak wavelength of the bright line spectral light, a wavelength at which the intensity value is maximized.

2. The method according to claim 1, wherein the intensity value is a highest of all the measured values.

3. A spectrophotometer, comprising:
   a) a monochromator having a diffraction grating for receiving and diffracting light from a standard light source for generating a known bright line spectral light whose emission intensity contains a change with a predetermined cycle due to a use of a power source for the standard light source, and a grating driver that rotates the diffraction grating;
   b) a light measurer for measuring an intensity of light from the monochromator;
   c) a monochromator controller for controlling the grating driver so as to rotate the diffraction grating in steps of a predetermined wavelength within a range including a peak wavelength of the bright line spectral light;
   d-1) a measured value obtainer for obtaining at least two times the intensity of light from the monochromator within the aforementioned cycle at each rotational position of the diffraction grating;
   d-2) an emission intensity determiner for determining an intensity value at the rotational position based on all measured values obtained by the measured value obtainer at the rotational position; and
   e) a peak locator for locating, as the peak wavelength of the bright line spectral light, a wavelength at which the intensity value is maximized within the aforementioned range.

4. The spectrophotometer according to claim 3, wherein the intensity value is a highest of all the measured values.

* * * * *